United States Patent
Mittelbach

(10) Patent No.: US 9,797,629 B2
(45) Date of Patent: Oct. 24, 2017

(54) METHOD FOR CARRYING OUT A HEAT TRANSFER BETWEEN ALTERNATELY WORKING ADSORBERS AND DEVICE

(75) Inventor: Walter Mittelbach, Freiburg (DE)

(73) Assignee: Fahrenheit AG, Halle/Saale (DE)

(*) Notice: Subject to any disclaimer, the term of this patent is extended or adjusted under 35 U.S.C. 154(b) by 1390 days.

(21) Appl. No.: 12/737,148

(22) PCT Filed: Jun. 16, 2009

(86) PCT No.: PCT/EP2009/057405
§ 371 (c)(1),
(2), (4) Date: Mar. 1, 2011

(87) PCT Pub. No.: WO2009/153245
PCT Pub. Date: Dec. 23, 2009

(65) Prior Publication Data
US 2011/0138824 A1    Jun. 16, 2011

(30) Foreign Application Priority Data
Jun. 19, 2008  (DE) .................. 10 2008 029 126

(51) Int. Cl.
F25B 17/00    (2006.01)
F25B 15/00    (2006.01)
F25B 17/08    (2006.01)

(52) U.S. Cl.
CPC ............. *F25B 17/083* (2013.01); *Y02B 30/64* (2013.01)

(58) Field of Classification Search
CPC .......... F25B 19/00; F25B 17/00; F25B 17/10; F25B 17/08; F25B 15/00; F25B 17/083; F25B 17/086; F25B 17/02; F25B 17/04; F25B 17/06; F25B 17/12; F25B 15/02; F25B 15/16
See application file for complete search history.

(56) References Cited

U.S. PATENT DOCUMENTS 2,024,083 A * 12/1935 Young .................. F25B 17/083
                                                   62/106
4,754,805 A * 7/1988 Rothmeyer .......... F25B 17/083
                                                 165/104.12

(Continued)

FOREIGN PATENT DOCUMENTS

EP    0731324    9/1996   .............. F25B 17/08
FR    2877426    5/2006   .............. F25B 17/08

(Continued)

OTHER PUBLICATIONS

International Search Report (In English) dated Dec. 22, 2009.

(Continued)

*Primary Examiner* — Grant Moubry
*Assistant Examiner* — Erik Mendoza-Wilkenfe
(74) *Attorney, Agent, or Firm* — Bodner & O'Rourke, LLP; Gerald T. Bodner; Christian P. Bodner

(57) ABSTRACT

The invention relates to a method for carrying out a heat transfer between alternately working adsorbers (Ad1, Ad2) in an adsorption refrigeration installation comprising an external cooling circuit (Kw) and an external heating circuit (Hw). The method is characterized by a closed heat transfer circuit, connected between the first and the second adsorber, comprising a heat transfer medium (Wm) circulating therein, a heat transfer with the external cooling circuit (Kw) being carried out in the heat transfer circuit via a first heat contact and a heat transfer with the external heating circuit (Hw) being carried out via a second heat contact.

7 Claims, 2 Drawing Sheets

(56) References Cited

U.S. PATENT DOCUMENTS

| | | | |
|---|---|---|---|
| 5,005,371 A * | 4/1991 | Yonezawa | F24D 11/02 |
| | | | 165/10 |
| 5,024,064 A | 6/1991 | Yonezawa et al. | 62/106 |
| 6,155,073 A * | 12/2000 | Gray | 62/480 |
| 7,497,089 B2 * | 3/2009 | Kakiuchi et al. | 62/112 |
| 2008/0034785 A1 * | 2/2008 | Yanagi | F25B 17/083 |
| | | | 62/478 |
| 2009/0094996 A1 | 4/2009 | Stitou et al. | 62/101 |

FOREIGN PATENT DOCUMENTS

| | | | |
|---|---|---|---|
| JP | 2006-300414 | 11/2006 | F25B 17/08 |
| WO | WO2006/048558 | 5/2006 | F25B 17/08 |

OTHER PUBLICATIONS

Notification of First Office Action (in English), dated Jun. 25, 2012, from Chinese Patent Office for corresponding Chinese Patent Application Serial No. 200980122981.4.

European Office Action (in German), dated Mar. 20, 2012 from European Patent Office for corresponding European Patent Application Serial No. 09 765 825.6.

Notification Concerning Transmittal of Copy of International Preliminary Report on Patentability (Chapter I of the Patent Cooperation Treaty), in English, dated Jan. 6, 2011, the International Preliminary Report on Patentability with Written Opinion of the International Searching Authority, in English, dated Jan. 18, 2011, which was issued by the International Bureau of WIPO for corresponding PCT Application No. PCT/EP2011/057405, filed on Jun. 16, 2009.

* cited by examiner

METHOD FOR CARRYING OUT A HEAT TRANSFER BETWEEN ALTERNATELY WORKING ADSORBERS AND DEVICE

The invention relates to a method for carrying out a heat transfer between alternately working adsorbers in an adsorption refrigeration system according to the preamble of claim 1 and to a device for carrying out a heat transfer between alternately working adsorbers according to the preamble of the patent claims.

In adsorption refrigeration systems comprising alternately working adsorbers a heat transfer between the two adsorbers needs to be carried out in the course of the thermodynamic cyclic process taking place in the system. This is necessary in order to adjust the temperature in each of the two adsorbers for an upcoming adsorption and desorption process of the refrigerating fluid driven around, thereby proceeding to the respectively following sub-step of the cyclic process. In the systems known from the prior art a heating and a cooling circuit are used for this purpose. By means of a valve system the first and second adsorber are alternately flown through by the medium circulating in the heating and cooling circuit until the temperatures in the two adsorbers are equal.

Such a procedure involves serious drawbacks. Due to the circulation of the heating and cooling media in the external, frequently large-sized circuits a number of hydraulic side effects occur, such as pressure losses and pressure peaks, which limit the heat transfer capacity between the respective adsorber and the heating and cooling medium. This has direct consequences for the time of adjustment with respect to the temperature equality in both adsorbers, which becomes unreasonably high, which has a negative effect on the entire cooling capacity of the adsorption refrigeration system.

Moreover, two independent external circuits have to be connected alternately to both adsorbers. This involves a great physical effort and requires correspondingly dimensioned and, thus, expensive valve systems. Also, the alternate flow of the heating and cooling media through the adsorbers causes an undesired hydraulic mixing of the heating and cooling circuit. Thus, external heating and cooling circuits have to be disregarded in the project planning of the adsorption refrigeration system if these are flown through by different media. Hence, the fields of application of a conventional adsorption refrigeration system are limited.

Therefore, it is the object to provide a method for carrying out a heat transfer between alternately working adsorbers in an adsorption refrigeration system comprising an external cooling circuit and heating circuit, which is devoid of the aforementioned drawbacks. Specifically, a mixing of the media from the external circuits is to be avoided, and the times of adjustment with respect to the temperature equilibrium between both adsorbers are to be shortened, so that the efficiency of the system can be sustainably enhanced.

With regard to the method aspect the object is achieved with a method for carrying out a heat transfer between alternately working adsorbers in an adsorption refrigeration system, comprising an external cooling circuit and an external heating circuit according to the features of claim 1, and with regard to the device aspect with a device according to the features of the patent claims. The respective dependent claims describe useful and advantageous embodiments of the method and the device.

The method according to the invention is characterized by a closed heat transfer circuit connected between the first and second adsorber, comprising a heat transfer medium circulating therein. A heat transfer with the external cooling circuit is carried out in the heat transfer circuit via a first heat contact and a heat transfer with the external heating circuit is carried out via a second heat contact.

As contrasted with the approach known from the prior art it is inventively provided that the external cooling and heating circuit are completely decoupled and separated from the adsorbers. Instead, a heat-transferring medium circulates in a heat transfer circuit through the adsorbers and exchanges thermal energy with the external circuits at points provided to this end.

Due to the size of the heat transfer circuit, which is thus basically reduced, and the limited quantity of the circulating heat-transferring medium associated therewith, the switching behavior is improved considerably when the heat transfer between the adsorbers is carried out, and is completely decoupled from the hydrodynamic conditions in the external circuits. This brings about short response times, less physical effort for the corresponding valve systems and, to a large extent, the avoidance of hydraulic side effects. Moreover, a mixing of the external circuits is precluded. Hence, they can be flown through actually by any media, provided that they meet the thermodynamic requirements of the adsorption refrigeration system.

Specifically, the heat transfer circuit includes the following sub-steps in a cyclic process:

In a first sub-step the heat transfer medium is heated in the second heat contact and enters the first adsorber. At the same time, the heat transfer medium exits the second adsorber and the medium is cooled in the first heat contact.

Thus, in this sub-step, thermal energy is withdrawn from and submitted to the external heating and cooling circuits. The heat transfer medium allows by means of its flow a thermal contact between the first and second adsorber and second and first heat contact, respectively, and thus the external heating and cooling circuit.

In a second sub-step the heat transfer medium is transferred between the first adsorber and the second adsorber. At the same time, the heat transfer medium is transferred from the first heat contact into the second heat contact.

This sub-step denotes the heat transfer between the two adsorbers. At the same time, the medium cooled in the first heat contact by thermal contact with the external cooling circuit flows into the second heat contact, where it is thermally contacted with the external heating circuit.

In a third sub-step the heat transfer medium is heated in the second heat contact and now enters the second adsorber. At the same time, the heat transfer medium exits the first adsorber and is cooled in the first heat contact.

Hence, the third sub-step substantially corresponds to the first sub-step, however, with the difference that the second adsorber is now thermally contacted with the second heat contact and thus with the external heating circuit, and the first adsorber with the first heat contact and thus with the external cooling circuit.

In a fourth sub-step the heat transfer medium is transferred between the second adsorber and the first adsorber. At the same time, the heat transfer medium is transferred from the first heat contact to the second heat contact.

Hence, the fourth sub-step corresponds to the second sub-step of the method. That is, by means of the heat transfer circuit in a cycle, on the one hand the first and on the other hand the second adsorber are thermally contacted with the external cooling and heating circuits, and both adsorbers are thermally contacted with each other in between, whereby they are always only flown through by a medium from a closed circuit.

In a particularly useful embodiment of the method the second heat contact is designed as an evaporator and the first heat contact is designed as a condenser. The heat transfer medium is evaporated in the evaporator, while it is condensed in the condenser.

During the first and third sub-step the heat transfer medium condenses when the heat transfer medium enters the second adsorber and the first adsorber, respectively. During the second and fourth sub-step, when the heat transfer medium is transferred between the first adsorber and the second adsorber, the heat transfer medium partially evaporates in one of the two adsorbers, while it condenses in the other adsorber.

On the whole, the heat exchange with the external circuits, in conjunction with the phase transitions in the evaporator and condenser taking place at the same time, increases the heat transfer capacity in the heat transfer circuit and, thus, the efficiency of the adsorption refrigeration machine considerably. At the same time, the duration of the heat recovery process between the two adsorbers, i.e. the length of time of the cyclic process performed in the heat transfer circuit, is reduced considerably. Above all, this is of major importance for fast switching adsorption refrigeration systems. Moreover, under these conditions, the heat transfer medium flows through the respective adsorbers in its vapor phase. This requires a considerably smaller physical effort for controlling the flow paths and brings about a far more uniform flow behavior, with which pressure peaks can be avoided.

Usefully, the heat transfer medium condensed in the condenser is collected in a condensate container interposed between the condenser and the evaporator. Thus, the flow of the heat transfer medium between the condenser and the evaporator can be controlled in an easy manner.

An advantage is the collection of the liquid heat transfer medium in the condensate container under the influence of gravity. Thus, no pumping means are necessary.

In one embodiment the first adsorber is replaced by a first heat exchanger and the second adsorber is replaced by a second heat exchanger, wherein an alternate evaporation of a refrigerant of the adsorption refrigeration system takes place in the first and second heat exchanger, with the heating circuit being replaced by the cooling circuit.

A device for carrying out a heat transfer between alternately working adsorbers in an adsorption refrigeration system comprising an external cooling circuit and an external heating circuit is inventively characterized by a heat pipe arrangement with a heat transfer medium circulating therein and thermally coupled to the external cooling circuit and the external heating circuit.

The heat pipe arrangement usefully comprises the following components: There are provided a first heat contact in thermal contact with the cooling circuit, a second heat contact connected to the first heat contact and in thermal contact with the heating circuit, a first valve unit between the first adsorber, the second adsorber and the second heat contact, and a second valve unit between the first adsorber, the second adsorber and the first heat contact.

The first heat contact is usefully designed as a condenser, the second heat contact as an evaporator. Additionally, in an advantageous embodiment, a condensate container interposed between the condenser and the evaporator is provided.

Usefully, a third valve is located between the condenser and the condensate container, and a fourth valve is located between the condensate container and the evaporator. Thus, it is possible to control the flow of the condensed heat transfer medium between the condenser, the condensate container and the evaporator.

The valve means realize the following, cyclically recurring valve states. In a first valve state there is an open connection between the evaporator and the first adsorber, an open connection between the second adsorber and the condenser, in a second valve state there is an open connection between the first adsorber and the second adsorber as well as an open connection between the condenser and/or the condensate container and the evaporator, in a third valve state there is an open connection between the evaporator and the second adsorber as well as an open connection between the first adsorber and the condenser, and in a fourth valve state the second valve state is reassumed.

In the first and third valve state, if the condensate container is provided, a connection between the condenser and the condensate container may be opened. Thus, the resultant condensed heat transfer medium can be collected and stored temporarily outside the condenser.

The first valve unit and/or the second valve unit are designed as a controllable three-way valve. In one embodiment the third valve may also be a controllable three-way valve.

The method and the device are now explained in more detail by means of embodiments. The accompanying FIGS. 1 and 2 serve illustration purposes. Like parts, or parts acting similarly, have like reference numbers. In the drawings:

FIG. 1 shows a heat pipe arrangement flown through by a heat transfer medium between a first adsorber Ad1, a second adsorber Ad2, an external cooling circuit Kw and an external heating circuit Hw.

Figure 1:
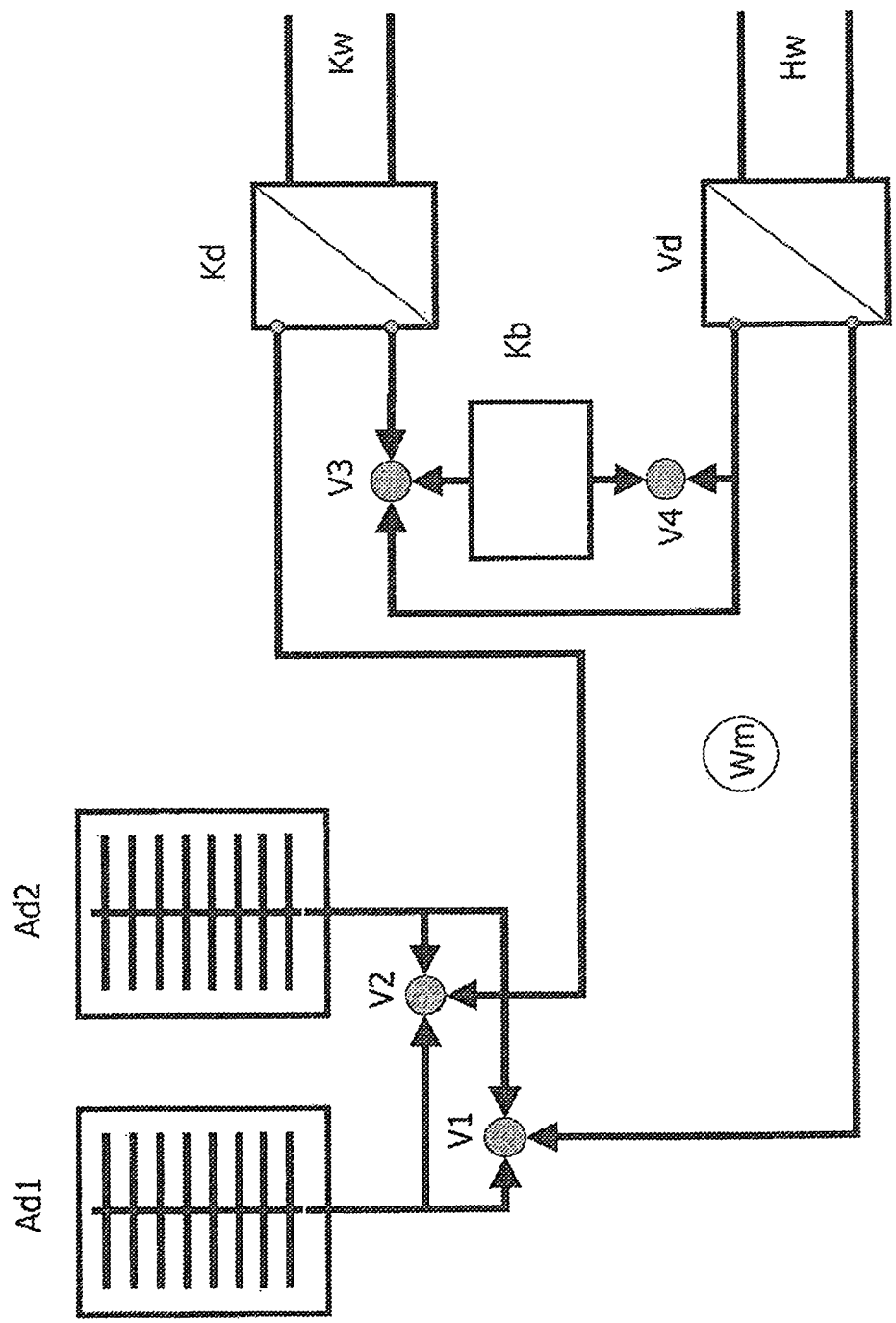
FIG. 1 shows a heat pipe arrangement flown though by a heat transfer medium.

The heat pipe arrangement is thermally coupled to the external cooling circuit by a condenser Kd and to the external heating circuit by an evaporator Vd. There is provided a condensate container Kb, which initially collects the heat transfer medium liquefied in the condenser and subsequently transfers it to the evaporator.

A number of valve units serve to control the flow and realize the working process taking place in the heat pipe arrangement. A first valve unit V1 controls the supply of the heat transfer medium from the evaporator Vd to the adsorbers Ad1 and Ad2 as well as the flow of the heat transfer medium between the two adsorbers Ad1 and Ad2. A second valve unit V2 controls the forwarding of the heat transfer medium from the adsorbers Ad1 and Ad2 to the condenser Kd as well as the flow of the medium between both adsorbers.

A third valve unit opens and closes a connection between the condenser Kd and the condensate container Kb and between the condensate container Kb and the evaporator Vd, respectively. A fourth valve unit finally opens and closes another connection between the condensate container and the evaporator.

In this example the valve units V1 and V2 are each designed as three-way valves, which are operated and switched by a non-illustrated control unit. Specifically, this may be accomplished electromechanically, pneumatically or also hydraulically.

In this example the third valve unit V3 is designed as a three way valve, which is disposed on the top side of the condensate container Kb and controls both the inflow from the condenser Kd and the outflow of the medium to the evaporator Vd. Such a position of the valve unit V3 is useful so as to obtain a self-regulating flow rate of the heat transfer medium from the condensate container to the evaporator. In the arrangement shown, the liquid medium in the condensate container is sucked off by the negative pressure caused by the evaporation of the medium in the evaporator, whereby the flow rate of the liquid medium between the condensate container and the evaporator is directly dependent on the evaporation rate of the medium in the evaporator. Like valve units V1 and V2 this valve unit, too, is operated by the control unit and can be switched electromechanically, pneumatically or also hydraulically.

The fourth valve unit V4 ensures a direct forwarding of the liquid heat transfer medium from the condensate container to the evaporator. In this regard a configuration is useful in which the condenser Kd is disposed above the condensate container Kb and the latter above the evaporator Vd, or at least on the height level thereof. With such a configuration the liquid heat transfer medium can flow into the condensate container alone under the influence of gravity and, if necessary, fall down into the evaporator Vd.

The different work cycles of the heat pipe arrangement are predetermined by the positions of the valve units V1, V2, V3 and V4, with three different positions being provided for valve units V1 and V2 and two different positions for valve units V3 and V4.

With reference to the following representation of valve unit V1 these are defined as follows:

In position V1-1 the connection between the adsorber Ad1 and the evaporator Vd is opened and the connection between the adsorber Ad2 and the evaporator Vd is closed. In position V1-2 the connection between the adsorber Ad2 and the evaporator V is opened and the connection between the adsorber Ad1 and the evaporator Vd is closed. In position V1-3 the connection between the adsorbers Ad1 and Ad2 is opened and their connections to the evaporator Vd are closed.

The following valve positions are defined for valve unit V2:

In position V2-1 the connection between the adsorber Ad1 and the condenser Kd is opened and the connection between the adsorber Ad2 and the condenser Kd is closed. In position V2-2 the connection between the adsorber Ad1 and the condenser Kd is closed and the connection between the adsorber Ad2 and the condenser Kd is opened. In position V2-3 the connection between the adsorbers Ad1 and Ad2 is opened and their connections to the condenser Kd are closed.

Valve unit V3 can assume the following valve positions:

In position V3-1 the connection between the condenser Kd and the condensate container Kb is opened and the connection between the condensate container Kb and the evaporator Vd is closed. In position V3-2 of valve unit V3 the connection between the condensate container Kb and the evaporator Vd is open and the connection between the condenser Kd and the condensate container Kb is closed.

Finally, the following valve positions are defined for valve unit V4:

In position V4-1 the connection between the condensate container Kb and the evaporator Vd is opened. In position V4-2 the connection between the condensate container Kb and the evaporator Vd is closed.

The valve positions described and the switching states of the valve units provided in the device, which are necessary in the individual steps of the working cycle, can of course be realized by a plurality of other valve constructions known to the person skilled in the art. The combination of the switch positions of the valve units V1 to V4, which is exactly predefined in each sub-step, particularly allows a compact construction comprising all valves, in the form of a special valve or a valve module, which realizes the switch positions described and in which the aforementioned valve units are constructionally united.

With due regard to the above-defined valve positions the cyclic process taking place in the heat pipe arrangement is carried out, for example, as follows: In a first step a desorption of the heat transfer medium takes place in adsorber Ad1 and an adsorption of the medium takes place in adsorber Ad2. The first valve unit V1 is here in position V1-1, the second valve unit V2 is in position V2-2, the third valve unit V3 is in position V3-1 and the fourth valve unit V4 is in position V4-2. In thermal contact with the heating circuit Hw the heat transfer medium evaporates in the evaporator Vd and flows to adsorber Ad1 where it condenses. At the same time, the medium evaporates in adsorber Ad2 and flows to the condenser Kd where it condenses in thermal contact with the external cooling circuit Kw. The heat transfer medium liquefied in the condenser flows into the condensate container Kb, where it is collected. The first step is concluded when the adsorber Ad1 has adopted a temperature $T_{HAd1}$ prevailing in the evaporator and determined by the external heating circuit Hw and when the adsorber Ad2 has adopted a temperature $T_{KAd2}$ prevailing in the condenser and determined by the external cooling circuit Kw.

In the second step a heat recovery takes place between the adsorber Ad1 and the adsorber Ad2. The first valve unit is here in position V1-3, the second valve unit is in position V2-3, the third valve unit is in position V3-2 and the fourth valve unit is in position V4-2.

The adsorbers Ad1 and Ad2 are now directly connected with each other and are cut off from the evaporator Vd and the condenser Kd. A part of the heat transfer medium in adsorber Ad1 evaporates and condenses in adsorber Ad2. As a consequence adsorbers Ad1 and Ad2 adopt a same temperature $T_G$. The second step is concluded when the temperature $T_G$ is reached. At the same time, the liquid heat transfer medium collected in the condensate container Kb is conducted into the evaporator Vd.

In the third step a desorption takes place in adsorber Ad2 and an adsorption takes place in adsorber Ad1. The first valve unit is here in position V1-2, the second valve unit is in position V2-1, the third valve unit is in position V3-1 and the fourth valve unit is in position V4-2. The heat transfer medium entering the evaporator Vd from the condensate container Kb evaporates in thermal contact with the external heating circuit Hw and flows into the adsorber Ad2 where it condenses. At the same time, the heat transfer medium evaporates in adsorber Ad1 and flows into the condenser Kd where it condenses in thermal contact with the cooling circuit Kw. The condensed heat transfer medium flows into the condensate container Kb, where it is collected. This step is concluded when the adsorber Ad2 has adopted the temperature $T_{HAd2}$ prevailing in the evaporator Vd and, thus, in the heating circuit Hw and when the adsorber Ad1 has adopted the temperature $T_{KAd1}$ prevailing in the condenser Kd and determined by the cooling circuit Kw.

In the fourth step a heat recovery takes place between the adsorber Ad2 and the adsorber Ad1. The first valve unit is here in position V1-3, the second valve unit is in position V2-3, the third valve unit is in position V3-2 and the fourth valve unit is in position V4-2. The adsorbers Ad2 and Ad1 are now directly connected with each other and are cut off from the evaporator Vd and the condenser Kd. A part of the heat transfer medium in adsorber Ad2 evaporates and condenses in adsorber Ad1. As a consequence adsorbers Ad1 and Ad2 adopt a same temperature $T_G$. The fourth step is concluded when the temperature $T_G$ is reached. At the same time, the liquid heat transfer medium collected in the condensate container Kb is conducted into the evaporator Vd. Thus, the working cycle is closed and followed again by the first step.

During this process the temperature of the heat transfer medium in the adsorbers, the condenser and the evaporator is continuously sensed by means of temperature sensors and transmitted to a non-illustrated control unit, which outputs switching signals to the valve units as a result of an internal program run and effects the corresponding valve positions.

As can be concluded from the above-described step sequence the heat transfer between the heat transfer medium and the cooling circuit in the condenser Kd, the heating circuit in the evaporator Vd and in the adsorbers Ad1 and Ad2 is associated with a phase transition. The heat transfer medium circulates in the section of the heat pipe located between the adsorbers and the condenser and between the adsorbers and the evaporator, and also in the section located between the adsorbers, in a gaseous or vaporous state, and is in a liquid state exclusively in the relatively short section located between the condenser and the evaporator. This brings about a particularly little physical effort along with a minimum of switching times for switching the valve units V1 and V2, while the fluid flow between the condenser Kd and the evaporator Vd takes place almost exclusively under the influence of gravity. Smaller valves can be used, along with a comparable thermal capacity. As the external hydraulic circuits Kw and Hw remain separated, pressure peaks in these circuits are completely avoided owing to the switching of valves.

The use of phase transitions in the heat transfer medium considerably reduces the duration of the heat recovery process between the adsorbers in the second and fourth steps of the working cycle. Above all, this is a great advantage in fast switching adsorption refrigeration machines. Moreover, the condenser Kd and the evaporator Vd can be designed and optimized with respect to their hydraulic properties, especially regarding a pressure loss, and their heat transfer capacities independently of the construction of the adsorbers. Here, especially a use of plate heat exchangers is appropriate.

Figure 2:
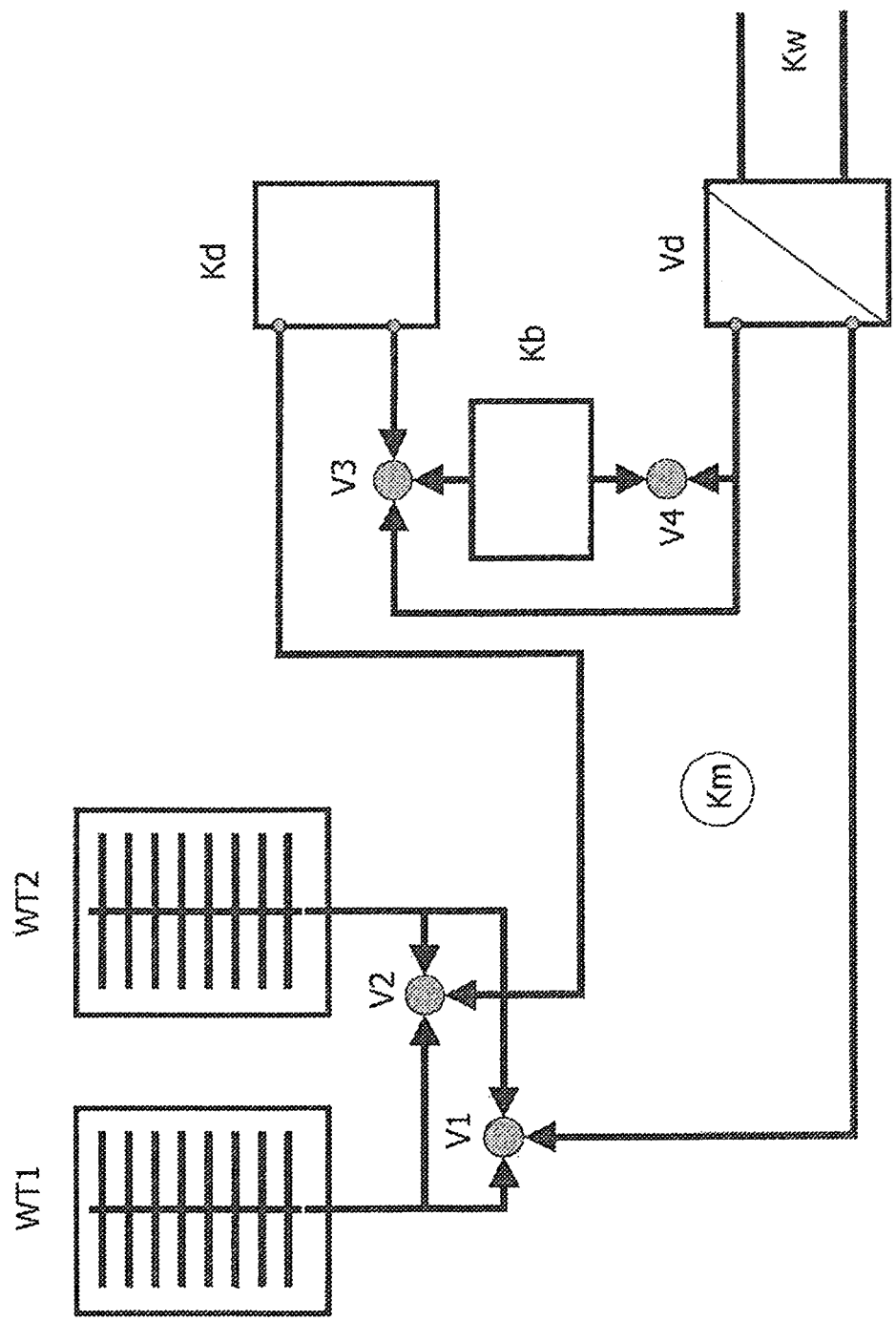
FIG. 2 shows an embodiment for a refrigerating medium driven around in the adsorption refrigeration system.

FIG. 2 shows an embodiment suited for driving around a refrigerant Km in the adsorption refrigeration system. With respect to its construction the embodiment of a refrigeration circuit shown in the figure substantially corresponds to the heat pipe arrangement shown in FIG. 1. However, in the present embodiment the previously mentioned adsorbers are replaced by two heat exchangers WT1 and WT2 which carry out an evaporation and condensation of the refrigerant Km and are thermally coupled to adsorbers Ad1 and Ad2 of the aforementioned arrangement. All other components and operation cycles in the cyclic process correspond to the aforementioned heat pipe arrangement according to FIG. 1. However, in this embodiment the evaporator Vd of the refrigeration circuit is coupled to the cooling circuit Kw mentioned in FIG. 1, while the condenser Kd of this embodiment is thermally coupled to the environment of the adsorption refrigeration system.

The type of the heat transfer medium in the embodiment according to FIG. 1 and of the refrigerant in the embodiment according to FIG. 2 depends on the exact conditions of use, especially on the temperatures present at the condenser and the evaporator and determined by the external circuits, and on the pressure prevailing inside the line as well as on the heat of evaporation of the media and the heating and refrigerating capacity at the evaporator and condenser and adsorbers and heat exchangers, respectively. A use of water as well as, for example, of ammonia or water-ammonia mixtures is also possible. This is to be taken into account within the framework of the competent action of the skilled person when planning the device and the method.

Additional embodiments arise from the competent action of the skilled person and are defined in the dependent claims.

LIST OF REFERENCE NUMBERS

Ad1 first adsorber
Ad2 second adsorber
Kb condensate container
Kd condenser
Km refrigerant
V1 first valve unit
V2 second valve unit
V3 third valve unit
V4 fourth valve unit
Wm heat transfer medium
WT1 first heat exchanger
WT2 second heat exchanger

The invention claimed is:
1. Method for carrying out a heat transfer between alternately working adsorbers in an adsorption refrigeration system, comprising an external cooling circuit (Kw) and an external heating circuit (Hw),
characterized by
a closed heat transfer circuit connected between a first and second adsorber, comprising a heat transfer medium (Wm) circulating therein, the heat transfer medium (Wm) not being used as a working medium in the working adsorbers, wherein the closed heat transfer circuit is configurable to directly and exclusively connect the first adsorber and the second adsorber, wherein a heat transfer between the heat transfer medium (Wm) and the external cooling circuit (Kw) is carried out in the heat transfer circuit via a first heat contact situated outside of the alternately working adsorbers and a heat transfer between the heat transfer medium (Wm) and the external heating circuit (Hw) is carried out via a second heat contact situated outside of the alternately working adsorbers, wherein the external cooling circuit (Kw) and the external heating circuit (Hw) are situated outside of the alternately working adsorb ers, wherein the external heating circuit (Hw) indirectly heats at least one of the first adsorber and the second adsorber by thermally contacting and heating the heat transfer medium (Wm) in the second heat contact and the external cooling circuit (Kw) indirectly cools at least one of the first adsorber and the second adsorber thermally contacting and cooling the heat transfer medium (Wm) in the first heat contact such that the external heating circuit (Hw) is not directly fluidly coupled to the heat transfer circuit, and such that the external cooling circuit (Kw) is not directly fluidly coupled to the heat transfer circuit, wherein the heat transfer medium (Wm) enters at least one of the first adsorber and the second adsorber and exits at least one of the first adsorber and the second adsorber, wherein the circulation of the heat transfer medium (Wm) causes the working medium in the adsorbers to be at least one of adsorbed and desorbed, wherein the heat transfer circuit carries out the following sub-steps in a cyclic process:

first sub-step: heating the heat transfer medium (Wm) in the second heat contact and entry of the heat transfer medium into the first adsorber (Ad1), simultaneously exit of the heat transfer medium (Wm) from the second adsorber (Ad2) and cooling the heat transfer medium in the first heat contact, second sub-step: transfer of the heat transfer medium (Wm) between the first adsorber (Ad1) and the second adsorber (Ad2), while simultaneously transferring the heat transfer medium (Wm) from the first heat contact into the second heat contact, third sub-step: heating the heat transfer medium (Wm) in the second heat contact and entry of the heat transfer medium into the second adsorber (Ad2), simultaneously exit of the heat transfer medium (Wm) from the first adsorber (Ad1) and cooling the heat transfer medium in the first heat contact, fourth sub-step: transfer of the heat transfer medium (Wm) between the second adsorber (Ad2) and the first adsorber (Ad1), simultaneously transfer of the heat transfer medium (Wm) from the first heat contact into the second heat contact;

wherein the closed heat transfer circuit is formed by a heat pipe arrangement;

wherein the second heat contact is an evaporator (Vd) and the first heat contact is a condenser (Kd), wherein an evaporation of the heat transfer medium (Wm) takes place in the evaporator (Vd) and a condensation of the heat transfer medium (Wm) takes place in the condenser; and wherein the heat transfer between the heat transfer medium and the cooling circuit in the condenser (Kd), the heating circuit in the evaporator (Vd) and in the adsorbers Ad1 and Ad2 is associated with a phase transition.

2. Method according to claim 1,
characterized in that
during the first and third sub-step, when the heat transfer medium enters the second adsorber (Ad2) and the first adsorber (Ad1), respectively, the heat transfer medium condenses, and that during the second and fourth sub-step, when the heat transfer medium is transferred between the first adsorber (Ad1) and the second adsorber (Ad2), the heat transfer medium partially evaporates in one of the two adsorbers, while it condenses in the other adsorber.

3. Method according to claim 1,
characterized in that
the heat transfer medium (Wm) condensed in the condenser (Kd) is collected in a condensate container (Kb) interposed between the condenser and the evaporator.

4. Method according to claim 1,
characterized in that
the liquid heat transfer medium (Wm) is collected in the condensate container (Kb) under the influence of gravity.

5. Method according to claim 1,
characterized in that
in one embodiment the first adsorber (Ad1) is replaced by a first heat exchanger (WT1) and the second adsorber (Ad2) is replaced by a second heat exchanger (WT2), wherein an alternate evaporation of a refrigerant of the adsorption refrigeration system takes place in the first and second heat exchanger, with the heating circuit (Hw) being replaced by the cooling circuit (Kw).

6. Method according to claim 1,
characterized in that
during the first and third sub-step, when the heat transfer medium enters the second adsorber (Ad2) and the first adsorber (Ad1), respectively, the heat transfer medium condenses, and that during the second and fourth sub-step, when the heat transfer medium is transferred between the first adsorber (Ad1) and the second adsorber (Ad2), the heat transfer medium partially evaporates in one of the two adsorbers, while it condenses in the other adsorber.

7. Method according to claim 6,
characterized in that
the heat transfer medium (Wm) condensed in the condenser (Kd) is collected in a condensate container (Kb) interposed between the condenser and the evaporator.

\* \* \* \* \*